United States Patent [19]

Ching-Ming

[11] Patent Number: 5,671,263
[45] Date of Patent: Sep. 23, 1997

[54] MOTION ARTIFACT SUPPRESSION FILTER FOR USE IN COMPUTED TOMOGRAPHY SYSTEMS

[75] Inventor: Lai Ching-Ming, Wakefield, Mass.

[73] Assignee: Analogic Corporation, Peabody, Mass.

[21] Appl. No.: 614,623

[22] Filed: Mar. 13, 1996

[51] Int. Cl.$^6$ .................................................. A61B 6/03
[52] U.S. Cl. ........................... 378/8; 378/901; 364/413.17
[58] Field of Search .................................. 378/8, 15, 901; 364/413.14, 413.16, 413.17

[56] References Cited

U.S. PATENT DOCUMENTS

| | | | |
|---|---|---|---|
| 5,229,934 | 7/1993 | Mattson et al. | 364/413.21 |
| 5,416,815 | 5/1995 | Hsieh | 378/4 |
| 5,446,799 | 8/1995 | Tuy | 382/132 |

OTHER PUBLICATIONS

Jiang Hsieh, Image Artifacts, Causes and Correction, Medical CT & Ultrasound: Current Technology and Applications (Goldman et al., ed.) Advanced Medical Publishing (1995) pp. 487–517.

*Primary Examiner*—David P. Porta
*Assistant Examiner*—David Vernon Bruce
*Attorney, Agent, or Firm*—Lappin & Kusmer LLP

[57] ABSTRACT

The disclosed motion artifact filter generates motion corrected signals from projection data signals to compensate for motion artifacts in CT images. Each measurement of the projection data signals is representative of the density of all the mass occupying a volume between an X-ray source and a detector at a particular projection angle. The motion artifact filter includes a high pass filter for generating high frequency signals representative of patient movement. Each measurement of the high frequency signals is generated by combining groups of measurements of the projection data signals corresponding to volumes that are proximal to each other. Each measurement of the motion corrected signals is generated by subtracting a portion of a measurement of a high frequency signal from its associated measurement of a projection data signal. The portions increase as the projection angle approaches a starting angle and the portions decrease as the projection angle approaches an intermediate angle.

34 Claims, 8 Drawing Sheets

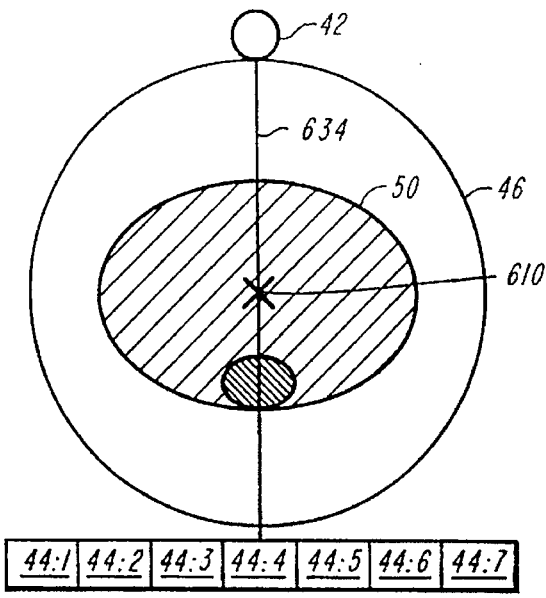
FIG. 6A
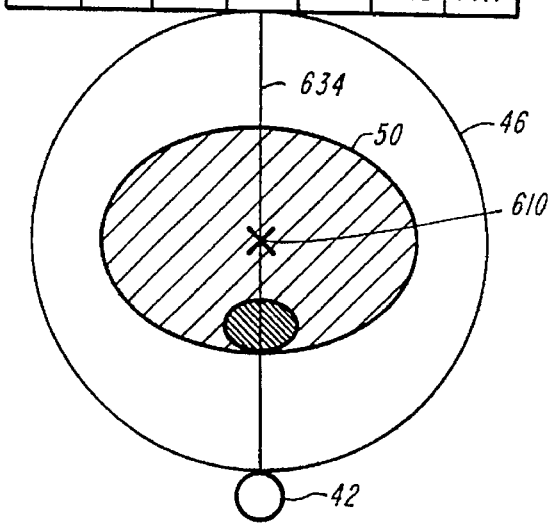
FIG. 6B
FIG. 7

MOTION ARTIFACT SUPPRESSION FILTER FOR USE IN COMPUTED TOMOGRAPHY SYSTEMS

CROSS-REFERENCE TO RELATED APPLICATIONS

This application is related to U.S. patent application Ser. No. 08/587,468, entitled STREAK SUPPRESSION FILTER FOR USE IN COMPUTED TOMOGRAPHY SYSTEMS, assigned to the present assignee, and filed on Jan. 17, 1996 (Attorney Docket No. ANA-081), which is hereby incorporated by reference, and to U.S. patent application Ser. No. 08/587,468, entitled RING SUPPRESSION FILTER FOR USE IN COMPUTED TOMOGRAPHY SYSTEMS, assigned to the present assignee, and filed concurrently with the present application (Attorney Docket No. ANA-087), which is hereby incorporated by reference, and to U.S. patent application Ser. No. 08/614,541, entitled SELF CALIBRATING RING SUPPRESSION FILTER FOR USE IN COMPUTED TOMOGRAPHY SYSTEMS, assigned to the present assignee, and filed concurrently with the present application (Attorney Docket No. ANA-102), which is hereby incorporated by reference.

FIELD OF THE INVENTION

The present invention relates generally to Computed Tomography (CT) systems used in the medical arts for generating CT images of, for example, human patients. More particularly, the invention relates to an improved filter for reducing artifacts in CT images caused by motion of the patient during a scan.

BACKGROUND OF THE INVENTION

Computed Tomography (CT) systems of the third generation type include an X-ray source and an X-ray detector system secured respectively to diametrically opposite sides of an annular-shaped disk. The disk is rotatably mounted within a gantry support so that during a scan, the disk continuously rotates about a rotation axis while X-rays pass from the source through an object positioned within the opening of the disk to the detector system.

The detector system typically includes an array of detectors disposed as a single row in the shape of an arc of a circle having a center of curvature at the point, referred to as the "focal spot", where the radiation emanates from the X-ray source. The X-ray source and the array of detectors are positioned so that the X-ray paths between the source and each detector all lie in the same plane (hereinafter the "slice plane" or "scanning plane") which is normal to the rotation axis of the disk. Since the X-ray paths originate from what is substantially a point source and extend at different angles to the detectors, the X-ray paths resemble a fan, and thus the term "fan beam" is frequently used to describe all of the X-ray paths at any one instant of time. The X-rays incident on a single detector at a measuring instant during a scan are commonly referred to as a "ray", and each detector generates an output signal indicative of the intensity of its corresponding ray. Since each ray is partially attenuated by all the mass in its path, the output signal generated by each detector is representative of the density of all the mass disposed between that detector and the X-ray source (i.e., the density of the mass lying in the detector's corresponding ray path).

The output signals generated by the X-ray detectors are normally processed by a signal processing portion of the CT system. The signal processing portion generally includes a data acquisition system (DAS) which filters the output signals generated by the X-ray detectors to improve their signal-to-noise ratio. The filtered output signals generated by the DAS are commonly referred to as "raw data signals". The signal processing portion usually includes a projection filter which logarithmically processes the raw data signals to generate a set of projection data signals so that each projection data signal is representative of the density of the mass lying in a corresponding ray path. The collection of all the projection data signals at a measuring instant is commonly referred to as a "projection" or a "view". During a single scan, as the disk rotates, a plurality of projections are generated such that each projection is generated at a different angular position of the disk. The angular orientation of the source and detector system on the disk corresponding to a particular projection is referred to as the "projection angle".

Using well known algorithms, such as the Radon algorithm, a CT image may be generated from all the projection data signals collected at each of the projection angles. A CT image is representative of the density of a two dimensional "slice", along the scanning plane, of the object being scanned. The process of generating a CT image from the projection data signals is commonly referred to as "filtered back projection" or "reconstruction", since the CT image may be thought of as being reconstructed from the projection data. The signal processing portion normally includes a back projector for generating the reconstructed CT images from the projection data signals.

One problem with CT systems is that a variety of noise and error sources may potentially contribute noise or artifacts to the reconstructed CT images. CT systems therefore typically employ a host of signal processing techniques to improve the signal-to-noise ratio and to reduce the presence of artifacts in the reconstructed CT images.

One important factor which can cause unwanted artifacts to appear in the reconstructed CT images relates to motion of the object being scanned during the scan. As is well known in the photographic arts, motion of the subject when a camera aperture is open causes blurring in the resulting photographs. Similarly, motion of the object being scanned during a CT scan causes artifacts in the resulting CT images, so ideally, the object being scanned remains motionless for the duration of the scan. However, since human patients are normally the subjects of CT scans and since it is generally difficult for humans to remain absolutely motionless, even for short periods, motion artifacts often degrade the quality of CT images. Further, whereas in a photograph, motion in one portion of the camera's field of view will only cause blurring in the region of the motion (e.g., motion of a subject's hand will cause blurring of the subject's hand but is unlikely to cause blurring of the subject's head), due to the nature of the reconstruction process, motion of one part of a patient during a scan may cause artifacts to appear in areas of the resulting CT image other than the part where the motion occurs. So, for example, a heart beating during a scan of the heart and surrounding area may cause artifacts to appear in those surrounding areas of the CT image that are not local to the heart.

FIG. 1 is an example of a reconstructed CT image of a human chest cavity and heart that is illustrative of the problems associated with motion artifacts. As those skilled in the art will appreciate, the CT image shown in FIG. 1 contains artifacts which interfere with interpretation of the image, and these artifacts are caused by motion of the heart during the scan.

Motion artifacts may be classified into two different types. The first type relates to differences in projections having projection angles separated by 180 degrees, and the second type relates to differences in projections at the starting and 'finishing' projection angles (i.e., the 'starting' projection angle is normally considered zero degrees and the 'finishing' projection angle is normally considered 360 degrees). If there is no patient motion during a scan, then any two projections generated 180 degrees apart are ordinarily very similar since both projections essentially represent the same or close to the same view (depending on the position of the detector array relative to the center ray, i.e., the ray passing through the isocenter of the disk) of the patient (although the relative positions of the X-ray source and the detectors are reversed). However, if the patient moves between a first projection taken at a projection angle of θ, and a second projection taken at a projection angle of θ plus 180 degrees, then the projections represent views of the patient at different postures. This difference generates motion artifacts of the first type. Similarly, if the patient moves between the projections taken at the starting and finishing projection angles, then the projections represent different views of the patient even though the X-ray source and the detectors are in identical positions at the starting and finishing projection angles. This difference generates motion artifacts of the second type. Motion artifacts of the first type normally appear in the reconstructed CT images as curvilinear streaks, which sometimes form a mosaic pattern. Motion artifacts of the second type often result in causing a shadow along the starting angle projection in the reconstructed CT images. In general, the exact appearance of a motion artifact depends on the size, location, and density of the region in motion as well as the speed and amplitude of the motion.

Prior art methods of suppressing motion artifacts typically involve low pass filtering the projection data signals to remove the high frequency components caused by motion of the patient. While such filtering effectively suppresses some motion artifacts of the first type, it also tends to reduce the overall resolution of the CT images. Such filtering is also ineffective at suppressing motion artifacts of the second type. Prior art methods of suppressing motion artifacts of the second type are commonly referred to as data feathering, and normally involve an "overscan" or an "underscan" procedure, however, such methods do not provide a significant degree of suppression, and they have other drawbacks such as requiring additional projections, reducing spatial resolution, and decreasing the signal-to-noise ratio.

There is therefore a need for improved methods and apparatus for reducing motion artifacts in CT images.

OBJECTS OF THE INVENTION

It is an object of the present invention to substantially reduce or overcome the above-identified problems of the prior art.

Still another object of the invention is to provide an improved motion artifact suppression filter.

Yet another object of the invention is to provide a motion artifact filter for suppressing motion artifacts of the first and second types.

And another object of the invention is to provide a motion artifact filter that treats motion artifacts of the second type as a generalized case of motion artifacts of the first type.

It is another object of the invention to provide a motion artifact filter including a high pass filter for generating high frequency signals indicative of patient movement.

Yet another object of the invention is to provide a motion artifact filter that includes a low pass filter for generating low frequency signals from the high frequency signals that are more accurately indicative of patient movement.

Still another object of the invention is to provide a threshold device for generating excess signals from the low frequency signals by comparing the low frequency signals to a threshold and setting the excess signal to zero if the magnitude of its associated low frequency signal is less than or equal to the threshold, and by setting the excess signal to be representative of the amount by which its associated low frequency signal exceeds the threshold otherwise.

And another object of the invention is to provide a motion artifact filter including a signal weighting function generator for generating a set of weighting factors corresponding to the error signals, the weighting factors increasing as their associated projection angles approach a starting and a finishing projection angle and the weighting factors decreasing as their associated projection angles approach a projection angle intermediate the starting and finishing projection angles.

It is another object of the invention to provide a motion artifact filter including a multiplier for generating error signals, each error signal being generated by multiplying its associated excess signal and weighting factor.

Yet another object of the invention is to provide a motion artifact filter including a subtractor for generating motion corrected signals by subtracting error signals from their corresponding projection data signals.

Still another object of the invention is to provide a motion artifact filter that splits a correction between projection data signals generated at opposite projection angles i.e., 180 degrees apart.

And another object of the invention is to provide a motion artifact filter that includes a parallel beam converter for converting fan beam projections into parallel beam projections.

SUMMARY OF THE INVENTION

These and other objects are provided by an improved artifact suppression filter. The filter may be used with a CT system which generates a projection at each of a plurality of projection angles including projection angles that are 180N degrees apart, where N is one or more whole integers, so as to provide pairs of opposing projections. Each projection includes measurements of a plurality of projection data signals, and each measurement is representative of the density of all the mass occupying a volume between a detector and an X-ray source of the CT system at one of the projection angles. Typically, the volume may have a conical shape or a "column like" shape. The motion artifact filter includes a device for comparing opposing pairs of projections to determine if artifact errors exist between the projections. If the difference between measurements from opposing projections exceeds a predetermined threshold value then the filter adjusts the measurements to compensate for artifact errors. According to another aspect of the invention, the filter may adjust the measurements by an amount that is a function of the projection angle, the function increasing as the projection angle approaches a starting angle and as the projection angle approaches a finishing angle, and the function decreasing as the projection angle approaches an angle intermediate to the starting and finishing angles.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein:

FIGS. 6A–B illustrate the spatial relationship between the X-ray source and the detectors for projection angles 180 degrees apart, which for purposes of illustration are identified at zero and 180 degrees respectively;

FIG. 7 illustrates the spatial relationship between the detector array at the projection angles of zero and 180 degrees shown in FIGS. 6A–B;

DETAILED DESCRIPTION OF THE DRAWING

Figure 2:
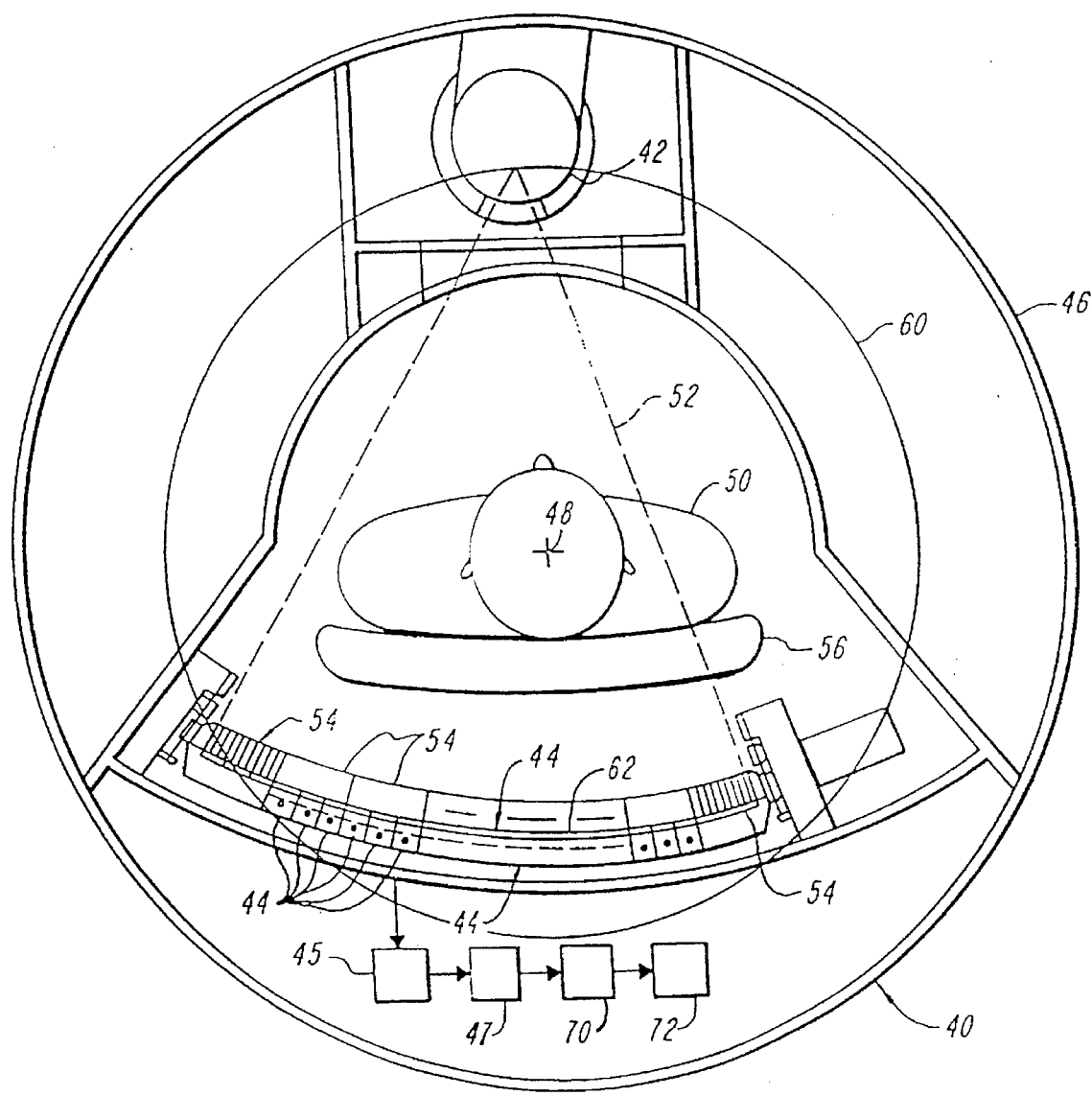
FIG. 2 is an axial view of a preferred CT system constructed according to the invention.

FIG. 2 shows an exemplary Computed Tomography (CT) system, or scanner, 40 incorporating the principles of the present invention. Scanner 40 includes an X-ray source 42 and a detector assembly 44 comprising an array of detectors mounted to a disk 46. Source 42 and detector assembly 44 are rotated about a rotation axis 48 (extending normal to the view shown in FIG. 2) so as to rotate around an object 50 that extends through the central opening of the disk 46 during a CT scan and so as to define an imaging field, indicated by 60, through which x-rays are passed and within which the density of any mass is determined during the scan. This imaging field is generally defined by a circle having a (1) center at the isocenter at the intersection of rotation axis 48 and the imaging plane through which X-rays pass, and (2) circumference around which the X-ray focal spot of source 42 travels. Object 50 may be a part of a live human patient, such as the head or torso. Source 42 emits within the scanning plane (normal to rotation axis 48) a continuous fan-shaped beam 52 of X-rays, which are sensed by the detectors of assembly 44 after passing through object 50. An array of anti-scatter plates 54 is preferably located between object 50 and the detectors of assembly 44 to substantially prevent scattered rays from being sensed by the detectors. In a preferred embodiment the detectors number 384 and cover an arc of 48°, although the number and angle can vary. Disk 46, which may advantageously be of a light weight material, such as aluminum, is caused to rotate rapidly and smoothly around axis 48. The disk 46 is of an open frame construction so that object 50 can be positioned through the opening of the disk. Object 50 may be supported, for example, on a table 56, which is preferably as transparent as is practical to X-rays.

The output signals generated by the detector assembly 44 are applied to DAS 70 (shown in block diagram form) which generates therefrom a set of raw data signals. The raw data signals are applied to a projection filter 72 which generates a set of projection data signals. As disk 46 rotates, the projection data signals are used to provide projection data from many projection angles. The projection data signals are applied to a motion artifact suppression filter 74 which filters the projection data signals in accordance with the invention in a manner that reduces motion artifacts in the reconstructed CT images. The output signals generated by motion artifact suppression filter 74, referred to as "motion corrected projection data signals", or simply as "motion corrected signals", are then applied to a back projector 76 which generates the CT images from the motion corrected signals. The back projector 76 includes a convolution filter (not shown) for convolving the data with well known convolution kernels for back projection.

Scanner 40 is a multi-channel device and the data in each channel includes one detector output signal and corresponding raw data, projection data, and motion corrected signals. In each channel, each of these signals is generated at each of the projection angles. The term "channel" as used herein is the path of a signal that originates from a detector and is then processed through the various described components with the understanding that several channels may, although not necessarily, share at least a portion of a common signal path, where, for example, those channels share a common element. For example, where a common element or elements are used to process the outputs of each of several subsets of detectors that make up the detector assembly, a multiplexor can be used to process the signals of each subset through the common element or elements.

As will be discussed further below, by using the motion corrected signals generated by motion artifact suppression filter 74 rather than the projection data signals generated by projection filter 72, back projector 76 is able to generate improved CT images having fewer motion artifacts and thus improved clarity. Preferably, motion artifact filter 74 is a non-linear filter, and filter 74 suppresses motion artifacts of both the first and second types in the CT images without significantly decreasing their resolution.

Figure 3:
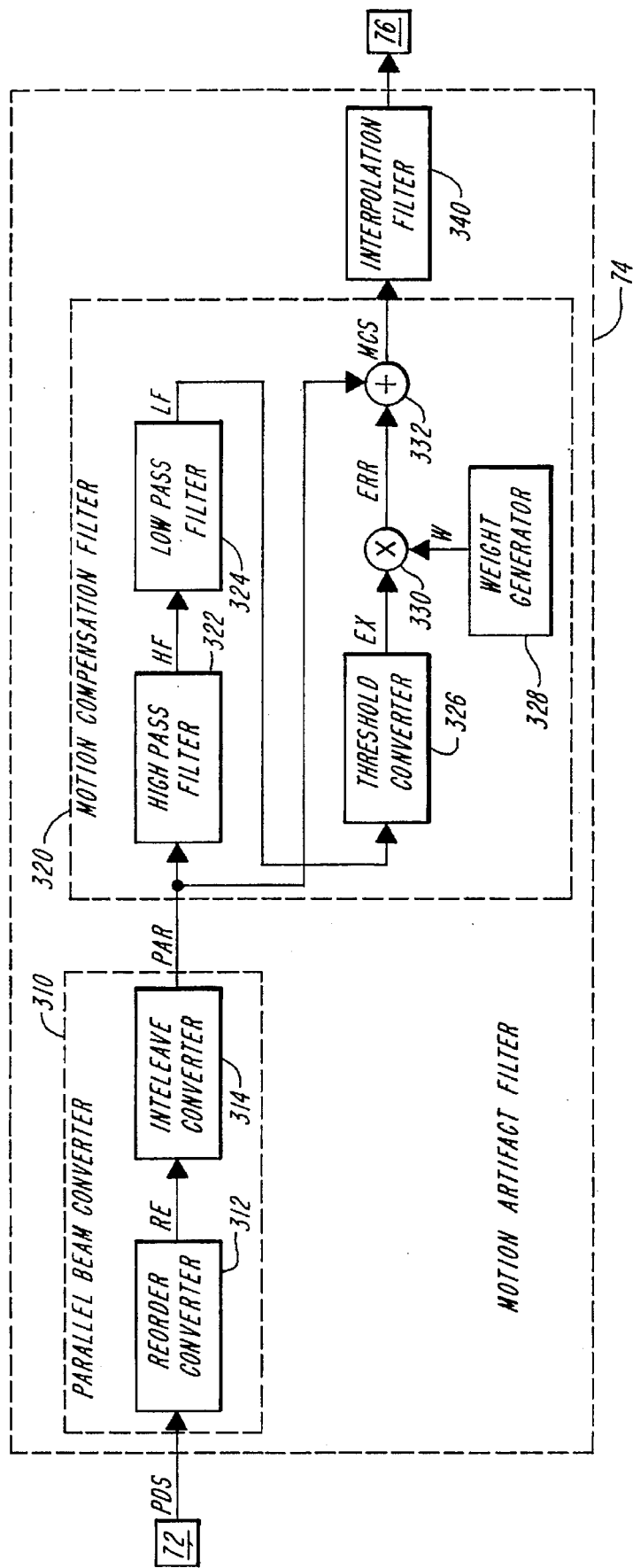
FIG. 3 is a block diagram showing in detail the preferred motion artifact suppression filter shown in FIG. 2.

FIG. 3 shows a block diagram of one embodiment of motion artifact suppression filter 74 constructed according to the invention. Preferably, filter 74 receives the projection data signals generated by projection filter 72 and generates therefrom the motion corrected signals that are applied to back projector 76. Motion artifact suppression filter 74 includes a parallel beam converter 310, a motion compensation filter 320 and an interpolation filter 340. Parallel beam converter 310 receives the projection data signals generated by projection filter 72 and generates therefrom a set of parallel beam signals. The parallel beam signals are applied to motion compensation filter 320 which generates the motion corrected signals that are applied to back projector 76 by way of interpolation filter 340.

Parallel beam converter 310 includes a reorder converter 312 and an interleave converter 314. Reorder converter 312 receives the projection data signals and generates therefrom a set of reordered signals. The reordered signals are applied to interleave converter 314 which generates therefrom the parallel beam signals. The projections generated by projection filter 72 may be thought of as "fan beam" data, since all the projections are generated using fan beam 52 (shown in FIG. 2). Parallel beam converter 310 re-organizes the projections to form parallel beam projections.

The measurements of the projection data signals generated by projection filter 72 during a single 360° scan (i.e., one rotation of the disk) may be organized in a matrix PDS as shown in the following Equation (1):

$$PDS = \begin{bmatrix} PDS(0,0) & PDS(1,0) & \ldots & PDS(N-1,0) \\ PDS(0,\Delta\theta) & PDS(1,\Delta\theta) & \ldots & PDS(N-1,\Delta\theta) \\ PDS(0,2\Delta\theta) & PDS(1,2\Delta\theta) & \ldots & PDS(N-1,2\Delta\theta) \\ \vdots & & & \\ PDS(0,360-\Delta\theta) & PDS(1,360-\Delta\theta) & \ldots & PDS(N-1,360-\Delta\theta) \end{bmatrix} \quad (1)$$

Each element $PDS(i,\theta)$ in the PDS matrix represents a measurement of the projection data signal in the ith channel for a fan beam projection angle equal to $\theta$. In Equation (1), N represents the number of channels in scanner 40 and one scan is considered to include a 360 degree rotation. As stated above, in the preferred embodiment there are 384 detectors in the array 44, so in the preferred embodiment there are 384 channels in scanner 40 and N is equal to 384. $\Delta\theta$ represents the amount of rotation of disk 46 between successive projections (i.e., $\Delta\theta$ is the angular increment of the projection angle between successive projections). In the preferred embodiment, disk 46 rotates one eighth of a degree between each projection and scanner 40 generates 2880 projections in a single 360° scan (i.e., eight projections per degree for 360 degrees), so in the preferred embodiment $\Delta\theta$ is equal to 0.125 degrees. Each row of the PDS matrix represents all the measurements of the projection data signals collected at a single projection angle, and in the preferred embodiment, there are 2880 rows in the PDS matrix. Each column of the PDS matrix represents all the measurements of a projection data signal collected in one channel during a single scan, and in the preferred embodiment there are 384 columns in the PDS matrix. The PDS matrix has cyclical nature in which the first row is the continuation of the last row, that is, PDS (i,0) and PDS (i,360) are signals generated from the same angular position. Although described in the context of a single 360° scan, it is contemplated that the invention can be used with scans other than 360°, such as the two resolution scans described in U.S. patent application Ser. No. 08/191, 428 entitled X-ray Tomography System for and Method of Improving the Quality of a Scanned Image.

Figure 4A:
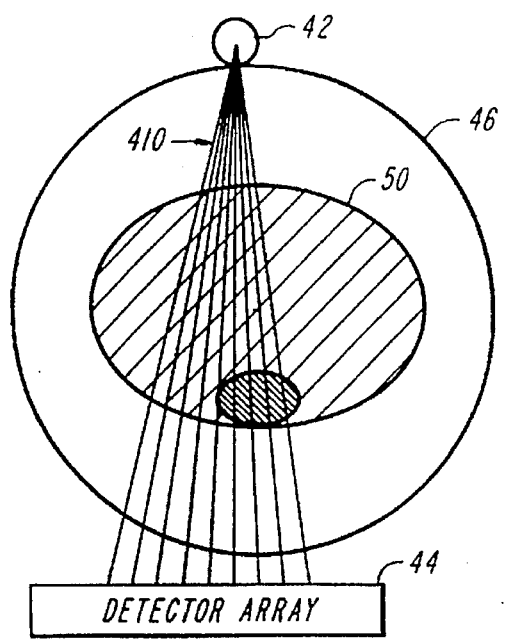
FIGS. 4A–B illustrate generation of fan beam and parallel beam projections, respectively.
Figure 4B:
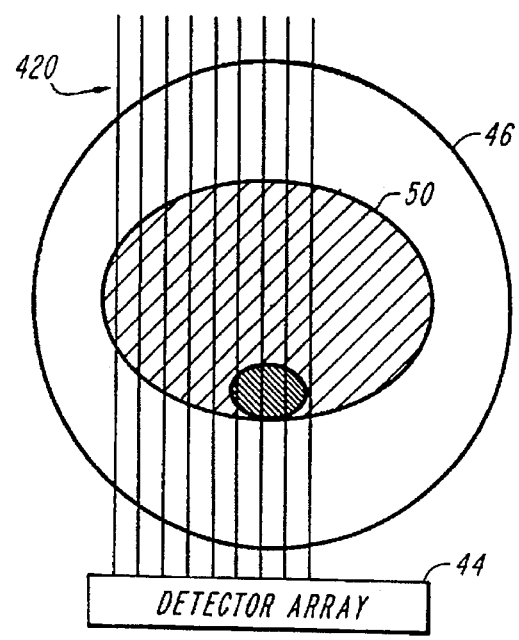

FIG. 4A illustrates a set of rays 410 forming one portion of a single projection view of a cross section of patient 50. Since each of the rays emanates from X-ray source 42, which is essentially a point source, none of the rays 410 are parallel, and the resulting projection is a fan beam projection. Each row of the PDS matrix corresponds to data signals generated during a single fan beam projection. Reorder converter 312 re-organizes the projection data signals so that each re-organized projection is formed by a set of parallel rays such as the rays 420 shown in FIG. 4B.

Figure 5A:
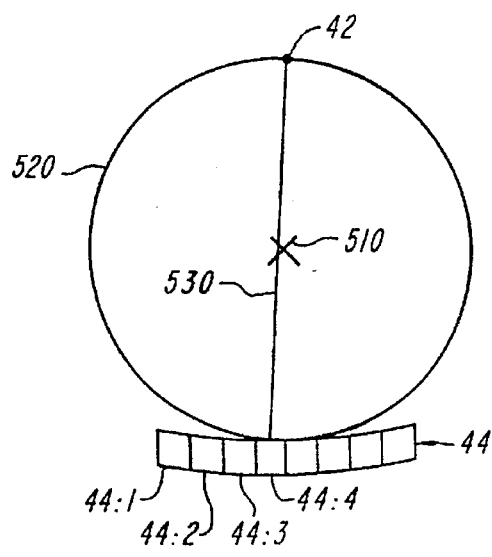
FIGS. 5A–B illustrate one method which may be used by parallel beam converters constructed according to the invention to generate parallel beam projections.
Figure 5B:
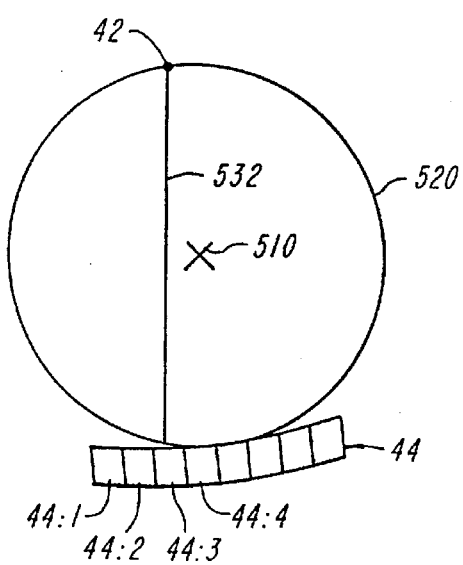

FIGS. 5A–B illustrate one preferred method, which may be used by reorder converter 312, for generating the re-organized projections. FIGS. 5A–B show the positions of X-ray source 42 and detector array 44 during generation of two successive projection views. During a scan, X-ray source 42 and detector array 44 rotate in a counter clockwise direction about a center 510 of circle 520. During the first projection, shown in FIG. 5A, a ray 530 is incident on a detector 44:4 (i.e., the fourth detector of array 44 form the left end as shown in the drawing). During the next projection, shown in FIG. 5B, a ray 532 is incident on detector 44:3 (i.e., the third detector of array 44 from the left end as shown in the drawing). In the preferred embodiment, the spacing between the detectors is matched to the amount of rotation between generation of successive projections so that ray 530 is parallel to, and slightly offset from, ray 532. In the preferred embodiment, this basic relationship is true for all detectors so that any two rays incident on adjacent detectors during successive projections are parallel and are slightly offset from each other although the spacing between the parallel rays vary. As was stated above, in the preferred embodiment $\Delta\theta$ is equal to 0.125 degrees, so in the preferred embodiment, each detector in array 44 is spaced apart from its adjacent detectors by 0.125 degrees. Reorder converter 312 of FIG. 3 uses this basic relationship to reorder the data and generate the reorganized projections.

Reorder converter 312 preferably re-organizes the PDS matrix to form a matrix RE of reordered signals so that each row of the RE matrix is equivalent to a projection formed by a parallel beam. Reorder converter 312 preferably generates the RE matrix so that each element $RE(i,\theta)$ of the RE matrix is chosen according to the following Equation (2) for all of the values of i and $\theta$.

$$RE(i,\theta) = PDS(i,[i-j][\Delta\theta] + \theta) \quad (2)$$

where the jth channel is the channel including the detector nearest to a center ray passing through the isocenter of the rotating disk. Each element $RE(i,\theta)$ of the RE matrix represents a measurement of the reordered signal in the ith channel for a parallel beam projection angle of $\theta$.

Reorder filter 312 of FIG. 3 may also include a low pass filter for averaging the projection data signals of adjacent parallel beam projection angles for each channel. This produces an averaged, or decimated, parallel beam matrix RE $(i,\theta)$ having fewer rows with a larger angular interval $d\theta$ between each row. The purpose of decimating the RE matrix in this manner is to reduce the computations for subsequent operations, but results in less information for creating the final reconstructed image.

Interleave converter 314 (shown in FIG. 3) receives the reordered signals and generates therefrom the parallel beam signals. Interleave converter 314 preferably combines pairs of parallel beam projections that are spaced apart by 180 degrees to form denser data values. FIGS. 6A and 6B illustrate the spatial relationship between X-ray source 42, a cross section of patient 50, and detector array 44 for projection angles of zero and 180 degrees, respectively. In FIGS. 6A–B for purposes of illustration, detector array 44 is shown containing seven detectors, and the detector in the fourth channel 44:4 is the central detector of the array 44. As was stated above, in the preferred embodiment, detector array 44 has 384 detectors, however, for convenience and ease of illustration, the seven detector embodiment will now be discussed. In the preferred embodiment, detector array 44 is slightly offset from the isocenter 610 of disk 46 such that a line 634 intersecting the focal spot of source 42 and isocenter 610 does not intersect the center of the detector 44:4, the detector nearest the center ray passing through the isocenter of the disk. In fact the array can be shifted after one complete revolution of the x-ray source and detector for a second revolution for acquiring additional and different data from that acquired during the first revolution to provide ever denser data values. The arrangement of such a detector system is more fully described in U.S. patent application Ser. No. 08/191,428, entitled, X-RAY TOMOGRAPHY SYSTEM FOR AND METHOD OF IMPROVING THE QUALITY OF A SCANNED IMAGE, filed on Feb. 3, 1994, (Attorney Docket No. ANA-044) and assigned to the present assignee, which is hereby incorporated by reference.

FIG. 7 illustrates the spatial relationship between detector array 44 at projection angles of zero and 180 degrees, and the rays 710, 712, 714 incident on three of the detectors. Because of the offset between array 44 and the isocenter 610 of disk 46, the detector array 44 at a projection angle of zero degrees is offset from the detector array 44 at 180 degrees. Consequently, the ray 710 that is incident on the sixth channel detector 44:6 for a projection angle of 180 degrees falls between the rays 712 and 714 that are incident on detectors 44:2 and 44:3, respectively, for a projection angle of zero degrees. In this example, detector 44:6 may be thought of as a "central" detector defining a "central" ray and detectors 44:2 and 44:3 may be thought of as "opposite-adjacent" detectors defining "opposite-adjacent" rays located with the corresponding central ray. At each projection angle, each detector measures the density of a portion of the patient, and in general, the portions measured by the opposite-adjacent detectors are closer to the portion measured by the central detector than are the portions measured by any other detectors (e.g., the portions measured by detectors 44:2, 44:3 at a projection angle of zero degrees are closer to the portion measured by detector 44:6 at a projection angle of 180 degrees than are the portions measured by detectors 44:5, 44:7 at a projection angle of 180 degrees). Any two projections separated by 180 degrees may be interleaved using this relationship between central and opposite-adjacent detectors to form a single denser set of projection data. In fact, in some scans, such as the two revolution scans of the type described in pending application U.S. application Ser. No. 08/191,428, reference above, any two projections separated by 180N, where N is one or more whole integers, may be interleaved using this relationship. In the case of detector offset for the first 360° and a shift for the second revolution, one can obtain four sets of parallel rays, one for each 180°, all interleaved with one another. For example, one such interleaved projection for the arrangement shown in FIG. 7 is composed of the quantities [RE(1, 0), RE(7,180), RE(2,0), RE(6,180), RE(3,0), RE(5,180), RE(4,0), RE(4,180), RE(5,0), RE(3,180), RE(6,0), RE(2, 180), RE(7,0), RE(1,180)] in which RE(i,θ) is the reordered signal generated from the detector in the ith channel at a projection angle of θ. Interleave converter 314 interleaves the reordered signals in this manner to form a denser set of projection data.

Interleave converter 314 (shown in FIG. 3) preferably generates a matrix PAR of measurements of the parallel beam signals, and each element PAR(i,θ) of the PAR matrix is a measurement of the parallel beam signal in the ith channel for a parallel beam projection angle equal to θ. The structure of the PAR matrix is shown in the following Equation (3):

$$PAR = \begin{bmatrix} PAR(0,0) & PAR(1,0) & \ldots & PAR(2N-1,0) \\ PAR(0,\Delta\theta) & PAR(1,\Delta\theta) & \ldots & PAR(2N-1,\Delta\theta) \\ PAR(0,2\Delta\theta) & PAR(1,2\Delta\theta) & \ldots & PAR(2N-1,2\Delta\theta) \\ \vdots & & & \\ PAR(0,180-\Delta\theta) & PAR(1,180-\Delta\theta) & \ldots & PAR(2N-1,180-\Delta\theta) \end{bmatrix} \quad (3)$$

As shown in Equation (3), the PAR matrix has twice as many columns as the PDS matrix, and half as many rows. So each row of the PAR matrix represents a parallel beam projection containing twice as much data as a row of the PDS matrix. Each parallel beam projection may therefore be thought of has having twice as many channels as a fan beam projection. Slightly different from the PDS matrix, the PAR matrix has a cyclical property in which the last row continues into the first row in reverse order, that is, PAR(0,180) and PAR(2N−1,0) are signals generated from the same angular position, as are PAR(1,180) and PAR(2N−2,0), and so on. In the preferred embodiment, interleave converter 314 generates the elements of the PAR matrix according to the following set of Equations (4) for all of the values of i and θ:

$$PAR(2i,\theta)=RE(i,\theta)$$

$$PAR(2i+1,\theta)=RE(N-1-i,\theta+180) \quad (4)$$

for $0 \leq i < N$

As is well known, parallel beam converters such as converter 310 for converting fan beam data to parallel beam data are normally connected to an interpolation filter, such as filter 340 (shown in FIG. 3). However, the interpolation filter is normally disposed immediately following the interleave converter 314. As mentioned above, since the detectors are generally dimensioned and positioned so that the angular displacement of each of the detectors, relative to the X-ray source, is equal for all detectors, the width of the converted parallel beams are not equal to one another. Therefore, each row of the PAR matrix (i.e., each parallel beam projection) contains data points which are not equidistantly spaced from one another. Rather, the elements representing values near the middle of isocenter for each projection are spaced further apart than are elements representing values near the edges of each projection. The interpolation filter interpolates the data and generates a new matrix of parallel beam data such that all the elements representing values of each projection are equidistantly spaced. In the preferred embodiment, the interpolation filter 340 uses known techniques to interpolate the data and generate projections containing equidistantly spaced elements, however, filter 340 is preferably disposed after motion compensation filter 320 as shown in FIG. 3, rather than immediately following the interleave converter 314. However, the invention will also function, but with interior results, if the interpolation filter 340 is disposed immediately following the interleave converter 314 with the output of the filter 340 then being connected to the input of motion compensation filter 320, the latter being described in detail hereinafter.

Also, as is well known, converting fan beam data to parallel beam data generally introduces a slight rotation such that the parallel beam projection angle of zero degrees is not exactly coincident with the fan beam projection angle of zero degrees. If not corrected, this rotation results in generating a reconstructed image that is slightly rotated from the horizontal. This rotation is generally introduced because the center detector 'j' as used in Equation (2) is generally not exactly centered with a line passing from the focal spot through the isocenter. The amount of rotation is generally smaller than $\Delta\eta/2$ and may be corrected using well known techniques by back-projector 72 or alternatively may simply be ignored.

Figure 8A:
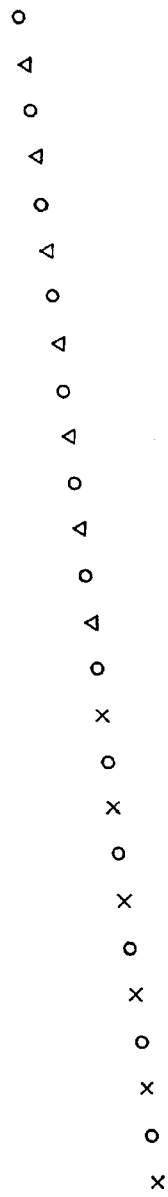
FIG. 8A is a graph showing exemplary signal levels in several channels of a parallel beam projection collected when there has been no patient motion.
Figure 8B:
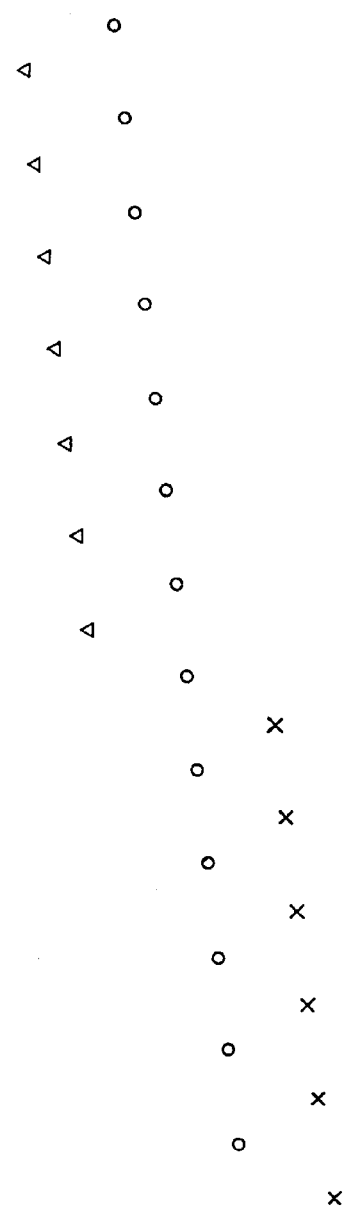
FIG. 8B is a graph showing exemplary signal levels in several channels of a parallel beam projection collected when there has been some patient motion.

FIGS. 8A–B are graphs showing the relative data values in a portion of one row of the PAR matrix illustrating the problem associated with patient motion. FIG. 8A represents data collected when there was no patient motion and FIG. 8B represents data collected when there is some patient motion during the scan. In FIGS. 8A–B, interleaved data points corresponding to fan beam projection angles near zero, 180, and 360 degrees are shown as triangles, circles, and x's respectively. The channels as interleaved are consecutively numbered, even though the actual detectors used to detect these data values may not be adjacent (e.g., channels 15 and 17 are opposite-adjacent channels from channel 16). In FIGS. 8A–B, the data point shown for channel number 21 (i.e., i=21) corresponds to a fan beam projection angle of exactly 180 degrees. The data points shown as circles to the left of channel 21 correspond to fan beam projection angles that are slightly greater than 180 degrees (e.g., channel 19 corresponds to 180 plus dθ, and channel 17 corresponds to 180 plus 2dθ), and the data points shown as circles to the right of channel 21 correspond to fan beam projection angles that are slightly less than 180 degrees. The data point shown for channel number 20 corresponds to a fan beam projection angle of exactly 360 minus dθ degrees, and the data points shown as x's to the left of channel 20 correspond to fan beam projection angles that are progressively less than 360 degrees. Similarly, the data point shown for channel number 22 corresponds to a fan beam projection angle of exactly zero degrees, and the data points shown as triangles to the right of channel 22 correspond to fan beam projection angles that are progressively greater than zero degrees.

FIG. 8A shows an example of the projection data collected when there is no patient motion during the scan. The data shown in FIG. 8A represents a slowly varying density profile of the patient. FIG. 8B shows an example of the projection data collected when there is some patient motion during the scan. In general, the data points corresponding to fan beam projection angles near zero degrees are offset from the data points corresponding to fan beam projection angles near 180 degrees. Similarly, the data points corresponding to fan beam projection angles near 180 degrees are offset from the data points corresponding to fan beam projection angles near 360 degrees. Finally, the data points corresponding to fan beam projection angles near zero degrees are likely to be more significantly offset from the data points corresponding to fan beam projection angles near 360 degrees. Viewing the data as shown in FIG. 8B simplifies understanding of the two different types of motion artifacts. The first type relates to the offset between data collected at any two fan beam projection angles separated by 180 degrees, and an example of this type of offset is shown in FIG. 8B by the offset between the data points in channels 34 and 35. The second type relates to the offset between the data collected at the starting and finishing angles and an example of this type of offset is shown in FIG. 8B by the offset between the data points in channels 20 and 22. As will be discussed further below, motion compensation filter 320 (shown in FIG. 3) effectively reduces artifacts of both types without significantly reducing the resolution of the CT images.

Referring again to FIG. 3, motion compensation filter 320 receives the parallel beam signals from parallel beam converter 310 and generates the motion corrected signals which in turn are applied to the input of interpolation filter 340. Motion compensation filter 320 preferably includes a high pass filter 322, low pass filter 324, a threshold converter 326, a weight factor generator 328, a signal multiplier 330, and a signal subtractor 332. As described in greater detail, hereinafter the parallel beam signals are applied to high pass filter 322 and to a positive input of subtractor 332. High pass filter 322 generates a set of high frequency signals from and in response to the parallel beam signals. The high frequency signals are applied to the input of low pass filter 324 which generates therefrom a set of low frequency signals. The low frequency signals are applied to threshold converter 326 which generates therefrom a set of excess signals. The excess signals are applied to one input of signal multiplier 330, and weight generator 328 generates a set of parallel beam weighting factors which are applied to the other input of signal multiplier 330. Signal multiplier 330 multiplies the parallel beam weighting factors with corresponding excess signals to generate a set of error signals which in turn are applied to a negative input of subtractor 332. Subtractor 332 subtracts the error signals from the corresponding parallel beam signals to generate the motion corrected signals.

High pass filter 322 preferably generates the high frequency signals by comparing (or high pass filtering) parallel beam signals from groups of central and opposite-adjacent detectors. For example, referring to FIG. 8B, one measurement of the high frequency signals may be generated by comparing the measurement of the parallel beam signal in central channel 16 (i.e., fan beam projection angle near 360 degrees) to the measurements of the parallel beam signals in opposite-adjacent channels 15 and 17 (i.e., fan beam projection angle near 180 degrees). In general, if the patient does not move during the scan, the portions of the patient measured by a central detector and its opposite-adjacent detectors are adjacent and partially overlapping. Therefore, when the patient doesn't move during a scan, the signals compared by high pass filter 322 to generate one high frequency signal are generally very similar. However, when a patient moves during a scan, the portion measured by a central detector is separated from the portions measured by its opposite-adjacent detectors by an amount determined by the patient's movement. Therefore, when a patient moves during a scan, the signals compared by high pass filter 322 may be significantly different. So, high pass filter 322 is preferably constructed to be sensitive to differences between signals from central and opposite-adjacent detectors and so that the high frequency signals are indicative of patient movement. Each group of three adjacent data points in FIGS. 8A–B represent measurements from a group including one central detector and two opposite-adjacent detectors. High pass filter 322 preferably compares groups of at least three adjacent data points so that high pass filter 322 is sensitive to patient motion.

High pass filter 322 preferably generates a matrix HF of measurements of the high frequency signals, and each element HF(i,θ) of the HF matrix is a measurement of the high frequency signal in the ith channel for a parallel beam projection angle equal to θ. In one preferred embodiment, high pass filter 322 generates each element HF(i,θ) of the matrix HF according to the formula shown in the following Equation (5) for all of the values of i and θ, although as those skilled in the art will appreciate, other filters may also be used.

$$HF(i,\theta) = PAR(i,\theta) - \frac{PAR(i-1,\theta) + PAR(i+1,\theta)}{2} \quad (5)$$

As those skilled in the art will appreciate, the structure of high pass filter 322 is simplified because interleave converter 314 has arranged the PAR matrix so that any three adjacent elements in all rows of the PAR matrix form a group containing measurements from one central detector and two opposite-adjacent detectors.

Low pass filter 324 (shown in FIG. 3) receives the high frequency signals and generates therefrom the low frequency signals. Low pass filter 324 preferably generates the low frequency signals by low pass filtering the high frequency signals across several channels. Since the effect of patient motion on the parallel beam signals varies relatively slowly across several channels, low pass filtering the high frequency signals provides an improved measurement of the patient motion.

Low pass filter 324 of FIG. 3 preferably generates a matrix LF of measurements of the low frequency signals, and each element LF(i,θ) of the LF matrix is a measurement of the low frequency signal in the ith channel for a parallel beam projection angle equal to θ. In one preferred embodiment, low pass filter 324 generates each element LF(i,θ) of the matrix LF according to the formula shown in the following Equation (6) for all of the values of i and θ:

$$LF(i,\theta) = A_0 HF(i,\theta) + A_1[HF(i-1,\theta) + HF(i+1,\theta)] + A_2[HF(i-2,\theta) + HF(i+2),\theta] \quad (6)$$

in which $A_0$ equals a weighting factor of 0.3, $A_1$ equals a weighting factor of −0.25, and $A_2$ equals a weighting factor of 0.1, although as those skilled in the art will appreciate, other values for the weight factors $A_0$, $A_1$, and $A_2$, as well as other filters may also be used. In the preferred embodiment, $A_1$ is a negative number and $A_0$ and $A_2$ are positive numbers. The reason for this may be understood by considering Equation (5) and the exemplary data shown in FIG. 8B. If the data shown in FIG. 8B is used in Equation (5), the measurement of the high frequency signal for channel 13, for example, will be a positive number, 8 and the corresponding measurements of the high frequency signals for channels 12 and 14 will both be negative numbers. In general, the elements HF(i,θ) will alternate in sign with each increment of i, and therefore, to properly average the high frequency signals across several channels, the sign of the constant $A_1$ should be opposite to the sign of the constants $A_0$ and $A_2$.

The low frequency signals are applied to threshold converter 326 (shown in FIG. 3) which generates therefrom the excess signals. Threshold converter 326 preferably generates the excess signals so that each excess signal is representative of how much greater or less than its corresponding low frequency signal is than a predetermined threshold value. Threshold converter 326 preferably generates a matrix EX of measurements of the excess signals, and each element EX(i,θ) of the EX matrix is a measurement of the excess signal in the ith channel for a parallel beam projection angle equal to θ. In one preferred embodiment, threshold converter 326 generates each element EX(i,θ) of the matrix EX according to the formula shown in the following set of Equations (7) for all of the values of i and θ:

$$EX(i,\theta) = \begin{cases} LF(i,\theta) - THR, & \text{if } LF(i,\theta) > THR \\ LF(i,\theta) + THR, & \text{if } LF(i,\theta) < -THR \\ 0, & \text{otherwise} \end{cases} \quad (7)$$

in which THR is a preselected positive constant threshold value. LF (i,θ) can be positive or negative and EX (i,θ) always follows the polarity of LF (i,θ), and the magnitude of EX(i,θ) is less than that of LF (i,θ) by as much as the threshold constant THR. Setting the excess signals equal to zero when the magnitude of the corresponding low frequency signals are less than the threshold THR prevents motion compensation filter 320 from interpreting small values of the low frequency signals as representative of patient motion. Such small values of the low frequency signal correspond to normal density variation of the patient as seen across several channels. The threshold THR is therefore preferably selected to be larger than the low frequency signals normally produced in the absence of patient motion, and small enough to effectively remove the motion artifacts from the CT images. One preferred value for the threshold THR is 0.01, when the relative maximum projection value of a patient (i.e., the maximum value of the projection data signals) is typically in the range of 5 to 10. When the magnitude of a low frequency signal exceeds the magnitude of the threshold THR, the magnitude of the corresponding excess signal is set equal to the amount by which the low frequency signal exceeds the threshold.

The excess signals are then applied to one input of multiplier 330 and the parallel beam weighting factors generated by weight generator 328 are applied to the other input of multiplier 330. Multiplier 330 generates the error signals by multiplying each of the excess signals by the corresponding parallel beam weighting factors. Weight generator 328 preferably generates a matrix $W_{pb}$ of parallel beam weighting factors, and each element $W_{pb}(i,\theta)$ of the $W_{pb}$ matrix is a weighting factor for the ith channel and a parallel beam projection angle equal to θ. Multiplier 330 preferably generates a matrix ERR of measurements of the error signals, and each element ERR(i,θ) of the ERR matrix is a measurement of the error signal in the ith channel for a parallel beam projection angle equal to θ. Multiplier 330 preferably generates the elements ERR(i,θ) according to the formula shown in the following Equation (8) for all of the values of i and θ:

$$ERR(i,\theta) = [W_{pb}(i,\theta)][EX(i,\theta)] \quad (8)$$

Subtractor 332 then generates the motion corrected signals by subtracting the error signals from the corresponding parallel beam signals. Subtractor 332 preferably generates a matrix MCS of measurements of the motion corrected signals, and each element MCS(i,θ) of the MCS matrix is a measurement of the motion corrected signal in the ith channel for a parallel beam projection angle equal to θ. Subtractor 332 preferably generates the elements MCS(i,θ) for all of the values of i and θ according to the formula shown in the following Equation (9):

$$MCS(i,\theta) = PAR(i,\theta) - ERR(i,\theta) \quad (9)$$

Figure 9:
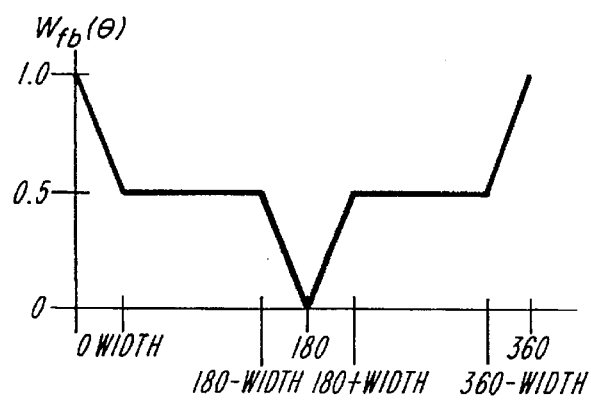
FIG. 9 is a graph of magnitude versus fan beam projection angle showing one preferred form of the fan beam weighting factors used in accordance with the present invention.

Weighting factor generator 328 may be thought of as generating a matrix $W_{fb}$ of "fan beam" weighting factors so that each element $W_{fb}(\theta)$ is a weighting factor for a fan beam projection angle of θ, and then as converting the fan beam matrix $W_{fb}$ to the parallel beam matrix $W_{pb}$. Although the values of the parallel beam weighting factors $W_{pb}$ are channel dependent, the values of the fan beam weighting factors $W_{fb}$ are channel independent and depend only on θ. Weighting factor generator 328 preferably generates the fan beam weights so that the formula shown in the following Equation (10) is true for all values of θ:

$$1 = W_{fb}(\theta) + W_{fb}(\theta + 180) \tag{10}$$

in which θ represents the fan beam projection angle. Further, the fan beam weighting factors preferably approach a value of unity as the fan beam projection angle approaches zero degrees and 360 degrees, and the fan beam weights preferably approach a value of zero as the fan beam projection angle approaches 180 degrees. The fan beam weighting factors are also preferably equal to one half (0.5) for the majority of projection angles between zero and 180 degrees and between 180 and 360 degrees. FIG. 9 is a graph of one preferred form of the fan beam weighting factors showing the value of the weighting factors for fan beam projection angles ranging from zero to 360 degrees. Preferably, the fan beam weighting factors decrease linearly from a value of unity to a value of one half (0.5) as the fan beam projection angle increases from zero degrees to "width" degrees. The fan beam weighting factors then remain constant at one half (0.5) as the fan beam projection angle increases from "width" degrees to "180 minus width" degrees. The fan beam weighting factors then decrease linearly from one half (0.5) to zero as the fan beam projection angle increases from "180 minus width" degrees to 180 degrees. The fan beam weighting factors then linearly increase from zero to one half (0.5) as the fan beam projection angle increases from 180 to "180 plus width" degrees. The fan beam weighting factors then remain constant at one half as the fan beam projection angle increases from "180 plus width" degrees to "360 minus width" degrees. The fan beam weighting factors then linearly increase from one half to unity as the fan beam projection angle increases from "360 minus width" degrees to 360 degrees. The parameter "width" determines at which fan beam projection angles the fan beam weights diverge from a value of one half. The acceptable range of values for this parameter is rather wide. One preferred value for "width" is 35 degrees, although as those skilled in the art will appreciate, other values of "width" as well as other functions of the fan beam weighting factors may also be utilized with the invention.

As those skilled in the art will appreciate, the parallel beam weighting factors may be generated by applying the fan beam weighting factors to a converter similar to parallel beam converter 310. Alternatively, weighting factor generator 328 may directly generate the parallel beam weights by, for example, storing them in a memory.

If the fan beam weights $W_{fb}$ are generated according to a function F(θ) (i.e., $W_{fb}(\theta) = F(\theta)$), where F(θ) is functionally described for example by the graph shown in FIG. 9, then the parallel beam weights for even channels may be generated for a parallel beam angle of θ for all values of i and θ according to the following Equation (11):

$$W_{pb}(2i,\theta) = F([i-j]\Delta\theta + \theta) \tag{11}$$

where j is the channel number corresponding to the detector intersecting the center ray from the focal spot through the isocenter. The parallel beam weighting factor for even numbered channels may then be generated for any parallel beam angle according to the following Equation (12):

$$W_{pb}(2i,\theta + k\Delta\theta) = F([i-j]\Delta\theta + \theta + k\Delta\theta) \tag{12}$$
$$= F([i+k-j]\Delta\theta + \theta)$$
$$= W_{pb}(2[i+k],\theta)$$

Similarly, the parallel beam weighting factors for odd numbered channels may be generated according to the following Equation (13):

$$W_{pb}(2i+1,\theta) = F([N-1-i-j]\Delta\theta + \theta + 180) \tag{13}$$

Equation (13) may be simplified by defining another function G(θ) in terms of F(θ) as shown in the following Equation (14):

$$G(\theta) = F([N-1]\Delta\theta + 180 - \theta) \text{ which gives } G([i+j]\Delta\theta - \theta) = F([N-1]\Delta\theta + 180 - [i+j]\Delta\theta + \theta) \tag{14}$$

Substituting G(θ) into Equation (13) yields a simple form for the parallel beam weighting factors for odd numbered channels as shown in the following Equation (15):

$$W_p(2i+1,\theta) = G([i+j]\Delta\theta + \theta) \tag{15}$$

The parallel beam weighting factors for odd channels may be generated for any parallel beam angle according to the following Equation (16):

$$W_{pb}(2i+1,\theta + k\Delta\theta) = G([i+j]\Delta\theta + \theta + k\Delta\theta) \tag{16}$$
$$= G([i+k+j]\Delta\theta + \theta)$$
$$= W_{pb}(2[i+k]+1,\theta)$$

Equations (12) and (16) provide simple forms for generating the parallel beam weighting factors for all angles in terms of the functions F(θ) and G(θ). Weighting factor generator 328 may generate the parallel beam weighting factors by storing the functions F(θ) and G(θ) in memories. As described by Equations (12) and (16), all the weights for any channel may be generated by beginning at an appropriate starting address and then sequentially scrolling through the memories. For example, the weighting factors for channel two may be generated using Equation (12) (since two is even) by initially calculating the function F with parameter i equal to one and parameter k equal to zero (for $W_{pb}$ (2,0)) and then by incrementing k to generate the weighting factors for all the other angles.

Figure 10:
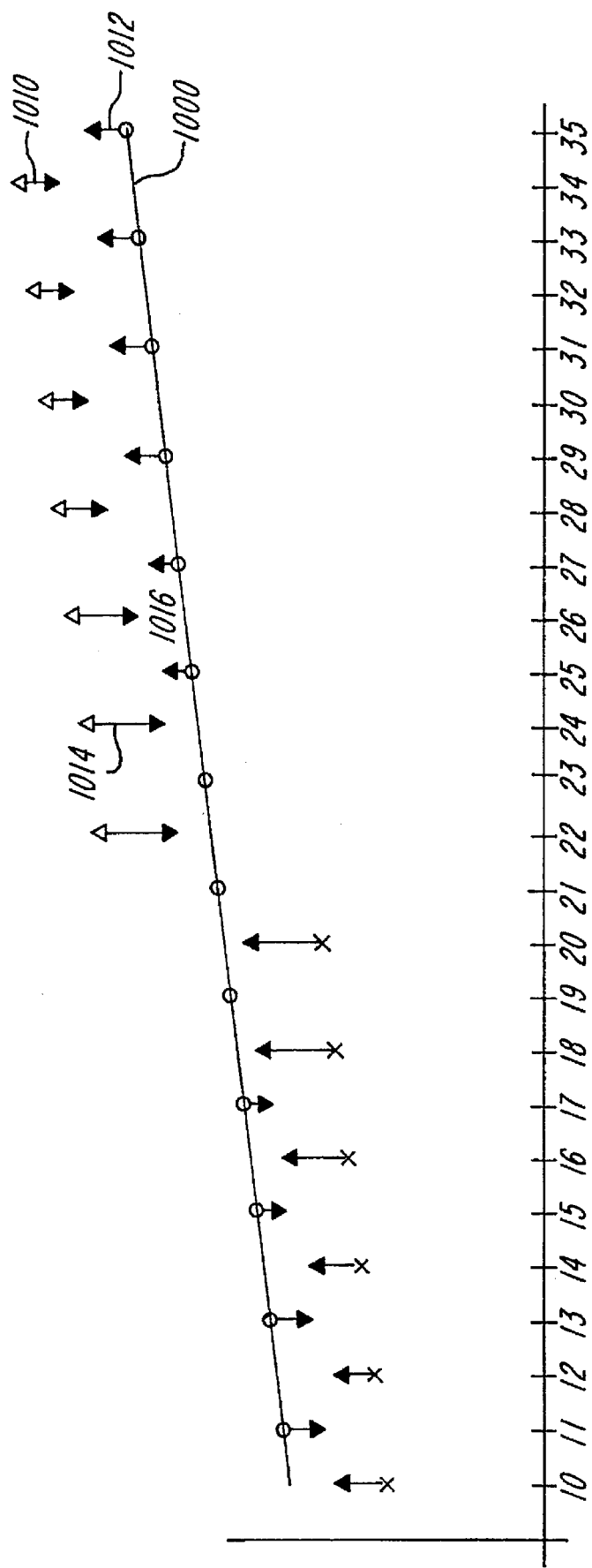
FIG. 10 is a graph of the same data shown in FIG. 8B and also showing the values that a motion artifact suppression filter constructed according to the invention may subtract from the measurements of the projection data signals to generate the measurements of the motion corrected signals.

FIG. 10 is a graph illustrating the generation of the motion corrected signals. In FIG. 10, the x's, circles, and triangles represent the same data points as shown in FIG. 8B and all the data points having a fan beam projection angle near 180 degrees (i.e., the circles) are shown connected by a line 1000. In FIG. 10, the arrows represent the magnitude and sign of the error signals which are subtracted from the parallel beam signals to generate the motion corrected signals. Thus, as illustrated for most of the data in each parallel beam projection, the weights are equal to one half (i.e., for all fan beam projection angles that are "far" from the starting and finishing projection angles and are also far from the intermediate projection angle of 180 degrees). As may be seen from Equations (8) and (9), when the weighting factors are equal to one half, the amount of correction is evenly divided between data points from fan beam projection angles separated by 180 degrees. This is illustrated in FIG. 10 by channels 34 and 35. The measurement of the motion corrected signal for channel 34 is generated by decreasing the measurement of the parallel beam signal for channel 34 and the measurement of the motion corrected signal for channel 35 is generated by increasing the measurement of the parallel beam signal for channel 35. In other words, the measurements of the motion corrected signals for channels 34 and 35 are generated by shifting the measurements of the projection data signals for these channels towards each other as indicated by arrows 1010, 1012. Since the weighting factors for channels 34 and 35 are both equal (to one half), the size of the arrows 1010, 1012 are roughly equal, and the amount of correction applied to these data points is evenly split between the channels.

Conversely, when the fan beam projection angle is near zero, 180 or 360 degrees, the weighting factors are not equal to one half, and the amount of correction is not split evenly between adjacent channels. This is illustrated in FIG. 10 by channels 24 and 25. The parallel beam weighting factor for channel 24 is close to one, and the parallel beam weighting factor for channel 25 is close to zero, so in these channels, most of the correction is applied to the data in channel 24 (as indicated by the relatively large arrow 1014) and only a relatively small correction is applied to the data in channel 25 (as indicated by the relatively small arrow 1016). When the fan beam projection angle approaches 180 degrees, the corresponding weighting factors linearly decrease to zero, so that no correction is applied to the data from 180 degrees. Similarly, when the fan beam projection angle approaches zero or 360 degrees, the weighting factors linearly increase to unity, so that all of the correction is applied to data from these angles. By varying the weighting factors in this manner, motion compensation filter 320 provides compensation for both types of motion artifacts, and treats artifacts of the second type as a generalized case of artifacts of the first type.

As those skilled in the art will appreciate, FIG. 10 is not drawn to scale and is presented merely for illustrative purposes. For example, in FIG. 10, the weighting factors are illustrated as decreasing from a value of unity at channel 22 to a value of one half at channel 34. In the preferred embodiments it takes many more channels for the weights to decrease from unity to one half, so if the weight was unity for channel 22, the weight may not have decreased to a value of one half until about channel 80. The same is of course true for the number of channels it takes for the weights to change from one half to zero.

So motion compensation filter 320 (shown in FIG. 3) compensates for motion artifacts by reducing the offset between parallel beam signals in adjacent channels (as shown in FIG. 10). When the fan beam projection angle is near zero, 180, and 360 degrees, most or all of the correction is applied to one channel (i.e., the offset is reduced by shifting the zero degree data towards the 180 degree data, and by shifting the 360 degree data towards the 180 degree data, and the 180 degree data is not shifted or is shifted only slightly). For other fan beam projection angles, filter 320 splits the correction between adjacent channels (i.e., filter 320 reduces the offset by shifting the data from opposite fan beam projection angles towards each other).

While the fan beam weighting factors as a function of channel position as shown in FIG. 9 is preferred, other weighting factor functions may be utilized in accordance with the invention. As long as the weighting factors satisfy the formula shown in Equation (10), motion artifacts of the first type will be corrected. Even in the extreme case where the weighting factors for a fan beam projection angle of θ equals unity and the weighting factor for a fan beam projection angle of θ plus 180 degrees equals zero, the motion artifact will be corrected. However, the reconstructed CT image will more closely resemble the patient as positioned during the projections having weighting factors of zero. Motion artifacts of the second type are corrected by smoothly varying the weighting factors from unity to zero as the fan beam projection angle ranges from zero to 180 degrees, and by smoothly varying the weighting factors from zero to unity as the fan beam projection angle ranges from 180 to 360 degrees. While FIG. 9 illustrates weighting factors as a piecewise linear function, those skilled in the art will appreciate that other functions, such as non-linear functions, may also be used for the weighting factors.

Motion artifact filter 74 has thus far been discussed in connection with the starting projection angle being equal to zero degrees (i.e., the first projection being generated at a fan beam projection angle of zero degrees), and the finishing projection angle being equal to 360 degrees. Those skilled in the art will appreciate that the orientation of zero degrees is an arbitrary convention and the first projection may not be generated at zero degrees. In this case, the starting projection angle is the angle at which the first projection is generated, and the finishing projection angle is 360 degrees away from the starting angle in the case of a 360° scan, and the weighting factors are generated so that they approach unity as the fan beam projection angle approaches the starting and finishing projection angles and the weighting factors approach zero as the fan beam projection angle approaches an intermediate angle that is 180 degrees away from the starting angle. Further, those skilled in the art will appreciate that since the starting and finishing projection angles are separated by 360 degrees for a 360 degree scan, approaching the finishing projection angle is equivalent to approaching the starting projection angle. When the starting projection angle is not equal to zero degrees, the fan beam weights may be generated by shifting the curve shown in FIG. 9 by an amount equal to the starting projection angle.

Due to the non-linear nature of motion artifact filter 74, and in particular threshold converter 326, filter 74 reduces the presence of motion artifacts without decreasing the resolution of the CT images. Resolution may be decreased in regions local to the patient motion, however, resolution is preserved in other regions (so for example in a CT image of a chest cavity, resolution of a beating heart may be decreased due to motion of the heart, but resolution in other regions of the CT image will be preserved). Further, since threshold converter 326 sets the excess signals equal to zero when the magnitude of the low frequency signals do not exceed the threshold value, in the absence of patient motion during a scan, filter 320 does not apply a correction to the projection data. Therefore, filter 320 does not affect the CT image in the absence of patient motion during a scan. This is in contrast to prior art motion artifact filters that reduce the resolution of CT images by low pass filtering the projection data regardless of whether there has been any patient motion during a scan.

Motion artifact filter 74 has been described as useful for suppressing motion artifacts. However, motion artifact filter 74 is actually useful for suppressing artifacts caused by any source that tends to create an amplitude discrepancy between opposite projection views (i.e., projections separated by 180 degrees). For example, if the intensity of fan beam 52 (shown in FIG. 2) is not uniform, projections from opposite projection angles may contain amplitude discrepancies even in the absence of patient motion. Such discrepancies tend to generate artifacts in the CT images, and filter 74 effectively suppresses such artifacts.

Figure 1:
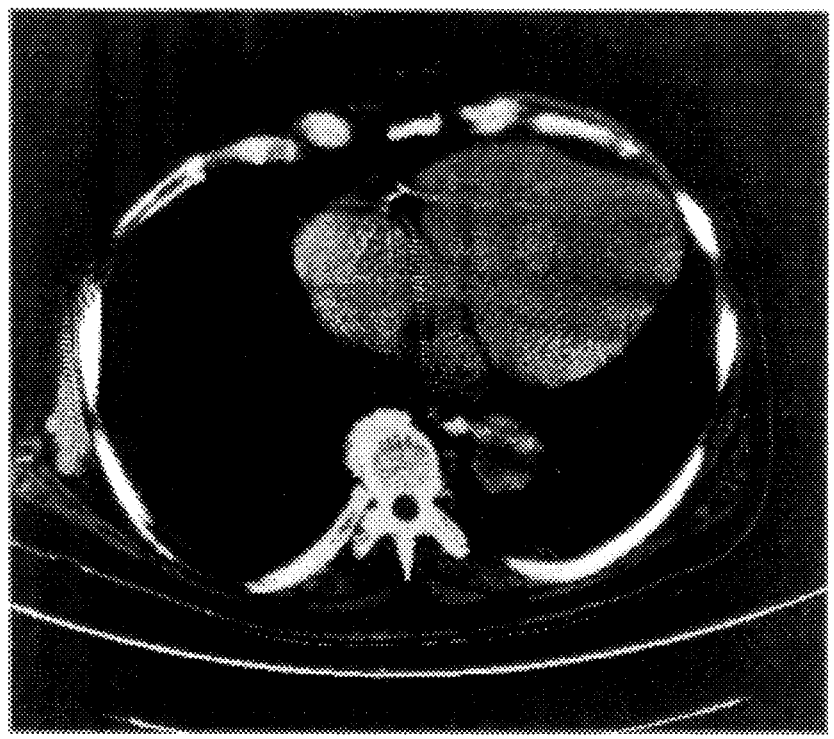
FIG. 1 is a CT image illustrative of the problems associated with motion artifacts.
Figure 11:
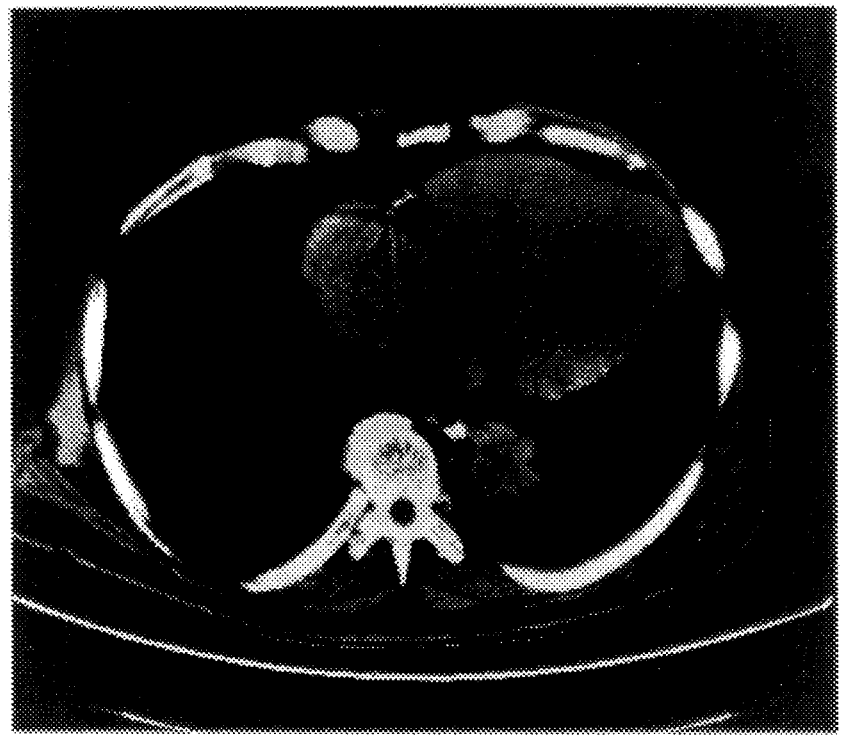
FIG. 11 is an example of a CT image generated using the same data used to generate the image shown in FIG. 1 but modified by a motion artifact suppression filter constructed according to the invention.

FIG. 11 is a CT image reconstructed using the same data that was used to reconstruct the CT image shown in FIG. 1. However, in FIG. 11, the projection data signals were first processed using motion artifact filter 74. For generation of this image, motion artifact filter 74 used a threshold of 0.01. The image shown in FIG. 11 has far fewer motion artifacts than the image shown in FIG. 1 and has increased clarity.

Figure 12:
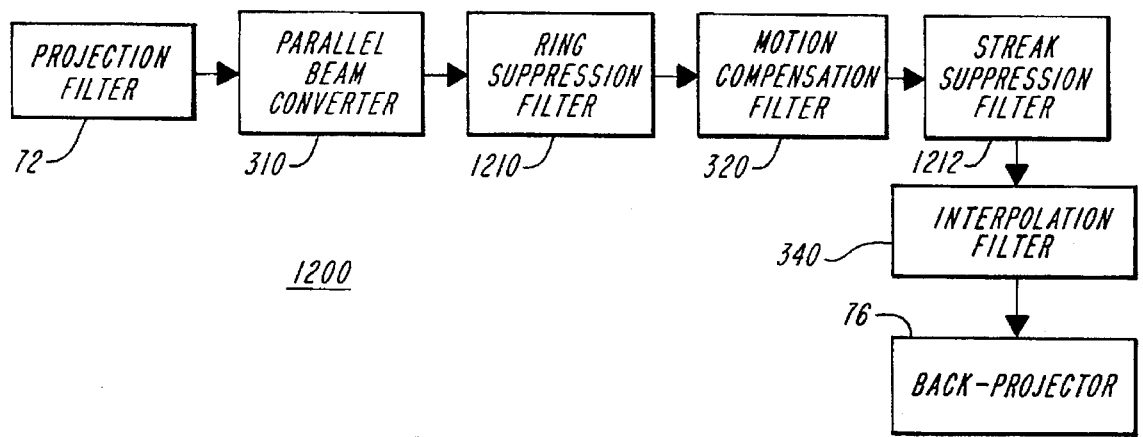
FIG. 12 is a block diagram of a signal processing portion of a preferred CT system constructed according to the invention including a ring suppression filter and a streak suppression filter of the type described in U.S. patent application Ser. No. 08/587,468.

Motion artifact filter 74 has been discussed in connection with use in a CT system for generating the motion corrected signals from the projection data signals supplied from projection filter 72. However, CT systems constructed according to the invention may apply many different types of filtering to the projection data signals prior to reconstructing a CT image. FIG. 12 is a block diagram of the signal processing portion of a preferred CT system 1200 constructed according to the invention. System 1200, in addition to motion compensation filter 320, includes a ring suppression filter 1210, and a streak suppression filter 1212, and interpolation filter 340 is disposed between streak suppression filter 1212 and back projector 72 rather than as a part of motion artifact filter as shown in FIG. 3. Ring suppression filter 1210 and streak suppression filter 1212 are respectively discussed more fully in the above-referenced U.S. patent application Ser. Nos. 08/614,541, and 08/614,660,entitled RING SUPPRESSION FILTER FOR USE IN COMPUTED TOMOGRAPHY SYSTEMS (Attorney Docket No. ANA-087) and SELF CALIBRATING RING SUPPRESSION FILTER FOR USE IN COMPUTED TOMOGRAPHY SYSTEMS (Attorney Docket No. ANA-102), respectively, and U.S. patent application Ser. No. 08/587,468, entitled STREAK SUPPRESSION FILTER FOR USE IN COMPUTED TOMOGRAPHY SYSTEMS (Attorney Docket No. ANA-081). Each suppresses other types of artifacts from the generated CT images as described in those applications. In the preferred embodiment of system 1200, the projection data signals generated by projection filter 72 are applied to parallel beam converter 310 which generates the parallel beam signals. The parallel beam signals are applied to ring suppression filter 1210 which generates a set of ring-compensated signals. The ring-compensated signals are applied to motion compensation filter 320 which generates therefrom the motion corrected signals. The motion corrected signals are then applied to streak suppression filter 1212 which generates a set of streak-compensated signals. The streak-compensated signals are then applied to back projector filter 76 via interpolation filter 340 which generates therefrom the reconstructed CT images.

In other embodiments of system 1200, any one or two of the ring suppression, motion compensation, and streak suppression filters may be eliminated. However, the preferred embodiment of system 1200 includes all three filters 1210, 320, 1212. In still other embodiments, ring suppression filter 1210 and/or streak suppression filter 1212 may be coupled between projection filter 72 and parallel beam converter 310 rather than between parallel beam converter 310 and back projector 76.

As those skilled in the art will appreciate, there are many different ways to implement motion artifact filter 74. For example, each of the components of motion artifact filter 74 may be implemented using discrete components, or alternatively, one or more of the components in filter 74 may be implemented as software running on a digital computer such as an array processor. Further, while filter 74 has been discussed as a digital system, in which each of the signals was sampled (e.g., the projection data signals were sampled to form a matrix PDS) those skilled in the art will appreciate that filter 74 may also be implemented as an analog filter using components which do not sample the signals and rather treat them as continuous signals. Further, parallel beam converter 310 may actually generate and store the parallel beam signals, or in alternative embodiments, parallel beam converter 310 may be eliminated from filter 74. In such embodiments, filter 74 may function as if parallel beam converter 310 were included simply by accessing the projection data signals in the order that parallel beam converter 310 would have provided them.

The foregoing motion artifact suppression filter is thus useful in suppressing, from a reconstructed CT image, motion artifacts of the first and second types as previously described, as well as certain artifacts due to intensity variations occurring during a CT scan.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. In a computed tomography system for generating an image of a portion of an object positioned within an imaging field, the system including scanning means for generating data from a plurality of projections at a corresponding plurality of projection angles of a scan, including projection angles that are 180N degrees apart, wherein N is one or more whole integers, so as to provide at least pairs of opposing projections, an artifact suppression filter comprising:

comparison means for comparing, for each of said pairs of opposing projections, the data from opposing projections so as to determine if artifact errors exist between the two projections of each pair and providing an indication if the comparison indicates a difference between said data above a predetermined amount; and means for adjusting the data for at least one of the opposing projections if the comparison means indicates the difference between the data is above the predetermined amount so as to compensate for such artifact errors.

2. A system according to claim 1, wherein said means for adjusting the data makes no adjustment to the data if the difference between the data is below the predetermined amount.

3. A system according to claim 1, wherein said scanning means includes means for generating a plurality of signals representative of a corresponding plurality of parallel rays projected through said imaging field for each of said projections, wherein the parallel rays of opposing projections are disposed along paths either identical to or displaced from one another.

4. A system according to claim 3, wherein the parallel rays of opposing projections are disposed along paths displaced from one another so that they are interleaved so as to create a plurality of central rays for each projection with corresponding opposite-adjacent rays of the opposite projection contiguous to the respective central ray, wherein the comparison means includes means for comparing the signal for each central ray for each projection with corresponding signals for the opposite-adjacent rays of the opposite projection and means for providing an indication if the comparison indicates a difference between said signals above a predetermined amount.

5. A system according to claim 3, wherein the comparison means includes means for comparing the signal for each central ray for each projection with corresponding signals for the opposite-adjacent rays of the opposite projection and means for determining the difference between the signal for each central ray for each projection and the corresponding signals for the opposite-adjacent rays, and said means for adjusting the data for at least one of the opposing projections includes means for determining whether the differences exceed a predetermined threshold.

6. A system according to claim 5, wherein said means for adjusting the data for at least one of the opposing projections includes means for correcting said data of the opposing projections when the differences exceed the predetermined threshold.

7. A system according to claim 1, wherein the scan is characterized by a starting projection angle and a finishing projection angle, said means for adjusting the data for at least one of the opposing projections includes means for adjusting the data by an amount as a function of the projection angle of the scan relative to the starting and finishing projection angles of the scan when the comparison means indicates the difference between the data is above the predetermined amount so as to compensate for such artifact errors.

8. A system according to claim 7, wherein said means for adjusting the data for at least one of the opposing projections includes means for adjusting the data by an amount as a function of the projection angle of the scan relative to the starting and finishing projection angles of the scan when the comparison means indicates the difference between the data is above the predetermined amount so as to compensate for such artifact errors so as to provide greater adjustment of said data for projection angles near and at the starting and finishing projection angles than for projection angles therebetween so as to provide compensation for movement of the object between the time of the starting projection angle and the time of the finishing projection angle.

9. A system according to claim 8, wherein said means for adjusting the data for at least one of the opposing projections includes means for adjusting the data by an amount as a function of the projection angle of the scan relative to the starting and finishing projection angles of the scan when the comparison means indicates the difference between the data is above the predetermined amount so as to compensate for such artifact errors so as to provide smaller adjustment of said data for projection angles substantially half way between the beginning and finishing projection angles so as to minimize compensation at such projection angles.

10. A system according to claim 7, wherein said means for adjusting the data by an amount as a function of the projection angle of the scan relative to the starting and finishing projection angles of the scan when the comparison means indicates the difference between the data is above the predetermined amount so as to compensate for such artifact errors comprises a non-linear weighting function so as to provide greater weighting of differences between the data at the beginning and finishing projection angles and lesser weighting of differences between the data at the projection angles therebetween.

11. A system according to claim 10, wherein the non-linear weighting function is defined as:

$1 = W(\theta) + W(\theta + 180°)$, wherein $\theta$ is the projection angle.

12. A system according to claim 11, wherein $W(\theta)$ is equal to unity when $\theta$ is equal to the starting angle and when $\theta$ is equal to the finishing angle.

13. A system according to claim 12, wherein $W(\theta)$ is equal to zero when $\theta$ is equal to the starting angle plus one hundred eighty degrees.

14. A system according to claim 13, wherein $W(\theta)$ is equal to one half for a majority values of $\theta$ between the starting and finishing angles.

15. A system according to claim 1, wherein the scanning means includes (a) means for scanning the object with a fan beam so as to generate fan beam projection data for each of said projection angles and (b) means for converting the fan beam projection data to parallel projection data for each of said projection angles, and wherein said comparison means includes means for comparing, for each of said pairs of opposing projections, the parallel projection data from opposing projections so as to determine if artifact errors exist between the two projections of each pair and providing an indication if the comparison indicates a difference between said parallel projection data above a predetermined amount; and means for adjusting the parallel projection data for at least one of the opposing projections if the comparison means indicates the difference between the parallel projection data is above the predetermined amount so as to compensate for such artifact errors.

16. A system according to claim 15, wherein the scan is characterized by a starting projection angle and a finishing projection angle, said means for adjusting the parallel projection data for at least one of the opposing projections includes means for adjusting the data by an amount as a function of the projection angle of the scan relative to the starting and finishing projection angles of the scan when the comparison means indicates the difference between the parallel projection data is above the predetermined amount so as to compensate for such artifact errors.

17. A system according to claim 16, wherein said means for adjusting the parallel projection data for at least one of the opposing projections includes means for adjusting the parallel projection data by an amount as a function of the projection angle of the scan relative to the starting and finishing projection angles of the scan when the comparison means indicates the difference between the parallel projection data is above the predetermined amount so as to compensate for such artifact errors so as to provide greater adjustment of said parallel projection data for projection angles near and at the starting and finishing projection angles than for projection angles therebetween so as to provide compensation for movement of the object between the time of the starting projection angle and the time of the finishing projection angle.

18. A system according to claim 17, wherein said means for adjusting the parallel projection data for at least one of the opposing projections includes means for adjusting the parallel projection data by an amount as a function of the projection angle of the scan relative to the starting and finishing projection angles of the scan when the comparison means indicates the difference between the data is above the predetermined amount so as to compensate for such artifact errors so as to provide smaller adjustment of said parallel projection data for projection angles substantially half way between the starting and finishing projection angles so as to minimize compensation at such projection angles.

19. A system according to claim 18, wherein said means for adjusting the data by an amount as a function of the projection angle of the scan relative to the starting and finishing projection angles of the scan when the comparison means indicates the difference between the data is above the predetermined amount so as to compensate for such artifact errors comprises a non-linear weighting function so as to provide greater weighting of differences between the data at the starting and finishing projection angles and lesser weighting of differences between the data at the projection angles therebetween.

20. A system according to claim 19, wherein the non-linear weighting function is defined as:

$1 = W(\theta) + W(\theta + 180°)$, wherein $\theta$ is the projection angle.

21. In a computed tomography system for generating an image of an object, the system including scanning means for generating a plurality of projections at a corresponding plurality of projection angles, each of the projections including a plurality of projection data signal measurements respectively representative of the density of mass occupying a corresponding volume of space during the measuring time associated with the projection, an artifact suppression filter comprising:

(A) high pass filter means, responsive to said plurality of projection data signal measurements, for generating a plurality of high frequency signal measurements, each of said high frequency signal measurements being a function of a group of the projection data signal measurements, each group of the projection data signal measurements including a first measurement and a second measurement, the volume associated with the first measurement being proximal to the volume associated with the second measurement, the first measurement being generated at a first projection angle and the second measurement being generated at a second projection angle; and (B) correction means for generating a plurality of correction signal measurements, each correction signal measurement having an associated one of the projection data signal measurements and an associated one of the high frequency signal measurements, each correction signal measurement being generated by shifting its associated one projection data signal measurement by a portion of its associated high frequency signal measurement the portion increasing as the projection angle corresponding to the one associated projection data signal measurement approaches a starting angle and the portion decreasing as the corresponding projection angle approaches an intermediate angle.

22. An artifact filter according to claim 21, wherein the starting angle is separated from the intermediate angle by substantially one hundred and eighty degrees.

23. An artifact filter according to claim 21, wherein the starting angle is substantially zero degrees and the intermediate angle is substantially one hundred and eighty degrees.

24. An artifact filter according to claim 21, wherein each group of projection data signal measurements further includes a third measurement, the volume associated with the third measurement being proximal to the volume associated with the first measurement, and the volume associated with the first measurement being between the volumes associated with the second and third measurements.

25. An artifact filter according to claim 24, wherein the high pass filter means generates each high frequency signal measurement so that each high frequency signal measurement is equal to the first measurement in its group minus an average of the second and third measurements in its group.

26. An artifact filter according to claim 24, wherein in each group of projection data signal measurements the projection angle corresponding to the first measurement is approximately one hundred and eighty degrees away from the projection angles corresponding to the second and third measurements.

27. An artifact filter according to claim 21, further including a low pass filter means for generating a plurality of low frequency signal measurements, each of the low frequency signal measurements being generated by low pass filtering a group of the high frequency signal measurements.

28. An artifact filter according to claim 27, further including threshold means, responsive to the plurality of low frequency signal measurements, for generating a plurality of excess signal measurements, each of the excess signal measurements being associated with one of the low frequency signal measurements, each of the excess signal measurements being representative of a difference between its associated low frequency signal measurement and a threshold.

29. An artifact filter according to claim 28, wherein each of the excess signal measurements is representative of zero if a magnitude of its associated low frequency signal measurement is less than a magnitude of the threshold.

30. An artifact filter according to claim 29, wherein each of the excess signal measurements is representative of its associated low frequency signal measurement minus the threshold when the magnitude of its associated low frequency signal measurement exceeds the magnitude of the threshold.

31. An artifact filter according to claim 28, further including means for generating a plurality of weighting factors, each of the weighting factors being associated with one of the projection data signal measurements, the weighting factors increasing as the projection angles corresponding to their associated projection data signal measurements approach the starting angle, and the weighting factors decreasing as the projection angles corresponding to their associated projection data signal measurements approach the intermediate angle.

32. An artifact filter according to claim 31, further including multiplication means for generating a plurality of error signal measurements, each of the error signal measurements corresponding to one of the projection data signal measurements, each of the error signal measurements being generated by multiplying one of the excess signals and the weighting factor associated with its corresponding projection data signal measurement.

33. An artifact filter according to claim 32, further including subtraction means for generating the plurality of motion correction signal measurements, each of the motion correction signal measurements being generated by subtracting one of the error signal measurements from its corresponding projection data signal measurement.

34. An artifact filter according to claim 21, wherein each of the projections is a parallel beam projection.

* * * * *